US008303145B2

(12) United States Patent
Wilcox

(10) Patent No.: US 8,303,145 B2
(45) Date of Patent: Nov. 6, 2012

(54) MARINE LIGHTING APPARATUS AND METHOD

(76) Inventor: Scott A. Wilcox, Plantation, FL (US)

( * ) Notice: Subject to any disclaimer, the term of this patent is extended or adjusted under 35 U.S.C. 154(b) by 271 days.

(21) Appl. No.: 12/610,045

(22) Filed: Oct. 30, 2009

(65) Prior Publication Data

US 2010/0110681 A1 May 6, 2010

Related U.S. Application Data

(60) Provisional application No. 61/109,844, filed on Oct. 30, 2008.

(51) Int. Cl.
*B60Q 1/00* (2006.01)

(52) U.S. Cl. .......................... 362/477; 362/555; 362/576

(58) Field of Classification Search .................. 362/477, 362/555, 576, 493
See application file for complete search history.

(56) References Cited

U.S. PATENT DOCUMENTS

| | | | | | |
|---|---|---|---|---|---|
| 2,559,421 | A * | 7/1951 | Garrett | 248/515 |
| 4,408,260 | A * | 10/1983 | Miedel | 362/576 |
| 4,912,889 | A * | 4/1990 | Palumbo | 52/28 |
| 4,943,900 | A * | 7/1990 | Gartner | 362/227 |
| 5,103,382 | A * | 4/1992 | Kondo et al. | 362/503 |
| 5,280,270 | A * | 1/1994 | Correa et al. | 340/471 |
| 5,463,535 | A * | 10/1995 | Vest | 362/102 |
| 5,992,804 | A * | 11/1999 | Johnson | 248/157 |
| 6,612,713 | B1 * | 9/2003 | Kuelbs | 362/102 |
| 6,863,016 | B2 * | 3/2005 | Biemiller | 114/361 |
| 7,107,926 | B2 * | 9/2006 | Fishburn | 114/361 |
| 2005/0263982 | A1 * | 12/2005 | Mickley | 280/414.1 |

* cited by examiner

*Primary Examiner* — Julie Shallenberger
(74) *Attorney, Agent, or Firm* — GrayRobinson, PA

(57) ABSTRACT

A marine lighting device mounts in-line with a tubular member of a marine vessel structure such as a T-top, tower or hand rail. An LED light bar having an array of LEDs supportably mounted to a circuit board is sealably enclosed in a tubular lens which, in turn is disposed within a tubular housing, a central portion of which is provided with an opening through which illumination from the LEDs is emitted after passing through the lens. A sleeve coupling is used to mount at least one end of the housing to a free end of the tubular member. In lieu of using a sleeve coupling at both ends one end of the housing may be flared to receive one of the free ends of the tubular member. A lighted T-top incorporating at least one such marine lighting device and a lighted marine handrail are also disclosed.

26 Claims, 5 Drawing Sheets

MARINE LIGHTING APPARATUS AND METHOD

CROSS-REFERENCE TO RELATED APPLICATIONS

This application claims priority under 35 U.S.C. §119(e) to U.S. Provisional Application Ser. No. 61/109,844 filed Oct. 30, 2008 for all commonly disclosed subject matter. U.S. Provisional Application Ser. No. 61/109,844 is expressly incorporated herein by reference in its entirety to form a part of the present disclosure.

FIELD OF THE INVENTION

The invention relates to the field of artificial lighting for marine vessels. More particularly the invention relates to a marine lighting device, a method of mounting same in a T-top, control tower or like marine vessel structure and a lighted handrail.

BACKGROUND OF THE INVENTION

Various types of artificial lighting devices for illuminating interior and/or exterior portions of marine vessels are known in the prior art. However, many suffer from one or more significant drawbacks. Incandescent lamp devices are generally energy inefficient and tend to place a heavy drain on marine batteries and demand on the capacity of the electrical power generators of marine vessels. Their illumination output per watt of electrical input power tends to be low. Incandescent lamps also have a relatively low operating life which, due to the heavy vibration associated with marine vessel applications is shortened even further. To allow their frequent replacement, incandescent lamps are usually mounted removably in sockets which must be readily accessible to permit such replacement. The sockets are generally housed inside an enclosure which has transparent or translucent lens connected to the body of the cover by way of an o-ring or flat ring type gaskets.

Gaskets of this type are subject to rapid degradation due to sunlight, solvents, and fuel, which are very often present in marine vessel environments where such lights are needed. They are also susceptible to damage and improper re-installation when the incandescent lamps are replaced. When the sealing ability of these gaskets is compromised, the device is readily infiltrated by seawater, or fresh water causing short circuits, corrosion and other type of failures.

Gas discharge lighting devices such as ones using fluorescent lamps can offer somewhat better lamp life but also require sockets of some type which must be accessed fairly often to replace the lamp. Accordingly, they too are subject to damage and failure due to water infiltration when their seals are compromised. Gas discharge lamps are also vulnerable to vibration damage and usually require electrical ballasts which make them expensive, bulky and often difficult to install.

To overcome at least some of the drawbacks of marine lighting devices with incandescent or gas discharge lamps many newer types use very bright, energy efficient and mechanically robust light emitting diodes as light sources. Modern LEDs are available in many colors and offer extremely long life.

Unless installed during the process of building the marine vessel in which they are used, many marine lighting devices are difficult to install. Although recessed or low-profile marine lighting devices are available for flat panel mount installations such as in walls or surfaces of control panels, conventional marine lighting devices used for after-market or retrofit applications generally are mounted such that they project outward from the structure which supports them. As such, they do not provide an aesthetically pleasing installed appearance and are more prone to damage or being knocked loose. More importantly, they occupy free space which is often limited in marine vessels and present obstructions which can be hazardous or interfere with safe and easy operation and use of this vessel.

SUMMARY OF THE INVENTION

The invention does not suffer from the disadvantages which have just been noted. One aspect of the invention relates to a marine lighting device which is mountable in-line with a member of tubular marine vessel structure such as a T-top, fishing tower, hand rail or the like. Structural integrity of the member can be maintained, and general or task illumination provided in an aesthetically pleasing manner owing in part to the ability of the invention to provide visual continuity of the profile of the lighting device with the tubular member resulting from their mutual longitudinal axial alignment as well as from maintaining substantially the same structural geometry of the marine vessel structure as was present prior to installation of the lighting device. Owing to use of light emitting diodes as a light source, high energy efficiency as well as improved reliability, enhanced operating life and immunity to shock and vibration as compared to conventional devices is provided.

A marine lighting device according to a preferred embodiment incorporates a linear array of multiple individual LEDs of any desired color or combination of colors. If desired, these can be wired such that the number, color, (or combination of colors) and location of various ones of the individual LEDs, or subgroups of the LEDs in the array can be independently controlled. For example, the device may incorporate one or more groups of white LEDs and one or more groups of LEDs. The white LEDs can be wired for switching off and on as desired to provide general illumination. However, for uses such as night fishing or in pilot areas when navigating at night, the red LEDs would be used in order to allow improved night vision.

Further aspects of the invention relate to lighted handrails and lighted tubular marine structures such as T-tops.

A further aspect of the invention relates to a method for in-line mounting of a marine lighting device in-line with a tubular member.

These and other aspects and advantages of the invention will be made clear to those skilled in the art upon review of the detailed description and the accompanying drawings wherein corresponding items are designated by like reference numerals.

DETAILED DESCRIPTION OF PREFERRED EMBODIMENT

Figure 1:
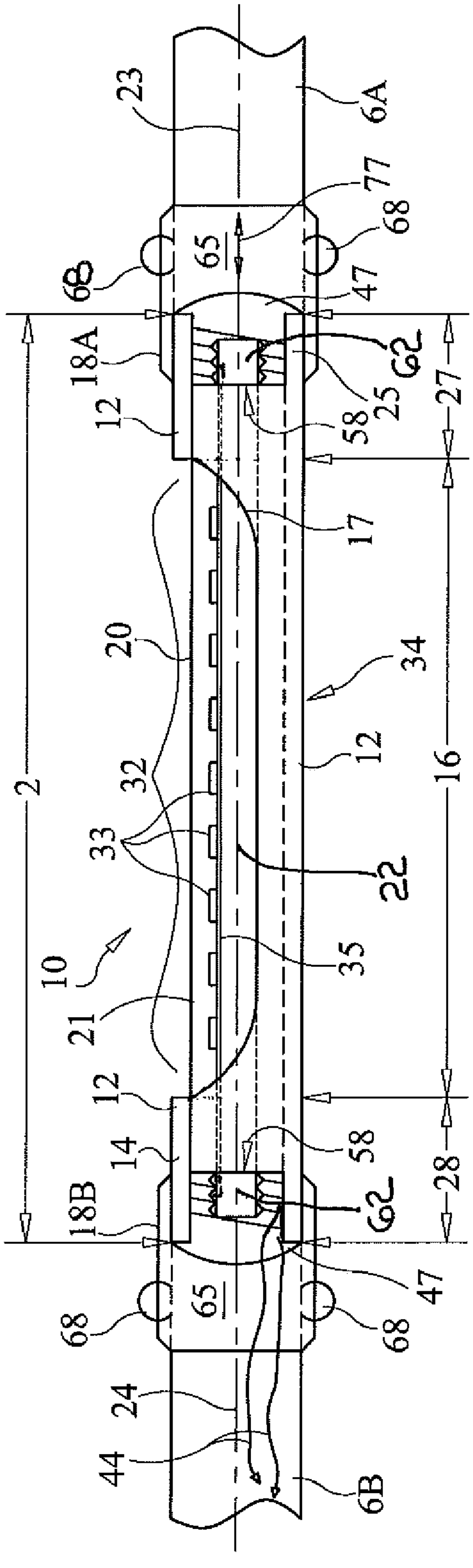
FIG. 1 is a side view partially in section, of a preferred embodiment of a marine lighting device.

A first preferred embodiment of a marine lighting device 10 according to the invention is suitable for mounting longitudinally in-line with a tubular member of a marine vessel structure and will now be described with reference to FIG. 1. Device 10 is mountable in a gap 2, present between opposed free ends 3, 4 of tubular member(s) 6A, 6B of a marine vessel structure. Device 10 has a tubular housing 12 whose outer wall 14 includes a partially open, or partially cutaway, central portion 16 which includes an edge 17 which defines the periphery of an opening 19 through which illumination may be emitted. Housing 12 has opposed ends 25, 26 and is preferably of a material such as brass, stainless steel or anodized aluminum having a wall thickness sufficient to provide sufficient mechanical strength for the application at hand. Housing 12 may be for example of polished anodized aluminum. Preferably, the strength of housing 12 is at least comparable to, and most preferably is greater than or equal to, that of the tubular members 6A, 6B between which lighting device 10 is attached by way of couplings 18A and 18B, respectively. As shown in FIG. 1, coupling 18A, 18B may suitably take the form of a sleeve coupling which internally receives both a free end portion of one of the tubular members as well as an end portion of the tubular housing 12. The longitudinal central axis 22 of device 10 and the respective longitudinal central axes 23, 24 of tubular members 6A and 6B are in at least approximate mutual axial alignment and are preferably substantially co-axial. However, housing 12 may be curved or angled along its length as may be needed. Housing 12 and couplings 18A and 18B should also be of materials which are galvanically compatible with one another, as well as with tubular members 6A, 6B, in order to avoid galvanic corrosion.

A tubular, clear or translucent lens 21 of acrylic, polycarbonate or other suitably strong and light-transmissive material is fitted inside housing 12, whose portions 27, 28 on opposite sides of its central partially open cutaway portion 16 hold lens 21 in place against lateral displacement. Preferably, lens 21 has a cross-sectional shape complementary to that of the interior of housing 12 and is sized to fit sufficiently snugly within housing 12 to avoid rattling and vibration. A snug fit also helps prevent infiltration of water or contaminants between the outside wall of lens 21 and housing 12 in the areas adjacent the edge 17 of the open portion 19 of housing 12. If desired, a bead of clear silicone or other suitable sealant (not shown) can be provided between lens 21 and the wall 14 of housing 12 around the periphery of the open portion 19 of housing 12. However, doing so is not essential.

Inside the tubular body of lens 21 is disposed an LED light bar 30 which includes an LED array 32 comprised of an arbitrary number of light emitting diodes 33 which are mounted on a circuit board 35. On the circuit board 35 there may also be mounted any resistors or other electronic components necessary for the proper electrical functioning of the LED array 32. The structure and operation of electronic circuits for driving LED arrays are known in the art and it is therefore not necessary to describe them here in further detail. As shown in FIG. 1, a pair of wires 44, routed through the hollow interior 37 of tubular member 6B for concealment, are provided for connecting LED light bar 30 to a switch 39 or other source of twelve volt D.C. electrical power. As previously noted, the LEDs 33 making up LED array 32 can include ones capable of providing light of any desired color(s) or combinations of colors and can be wired to be controlled individually or in groups or subgroups.

LED light bar 30 is held in place inside the tubular body of lens 21 by a pair of plastic end caps 47, one of which is press fitted inside each end 49, 50 of the tubular body of lens 21. The portions of the caps 47 which are received inside the ends 49, 50 of lens 21 are hollow and have on their outside a number of outwardly projecting circumferential ridges 53 which are compliant and form a watertight seal with the inside wall 54 of each end 49, 50 of the tubular lens 21. Water and contaminants are thus prevented from entering the interior of lens 21 thereby protecting LED light bar 30 against such elements.

The length of LED light bar 30 is such that at least a portion of each of its opposed ends 55, 56 is captured within the hollow inside portion 58 of a respective one of the end caps 47. In this way the LED light bar 30 is supported so that some space 60 is always maintained between the LED light bar 30 and the inside wall 54 of lens 21. The end caps 47 are preferably of a soft plastic, artificial rubber or silicone material which, in addition to providing a good seal, also serves to dampen the transmission of vibration to LED light bar 30 and prevent the light bar 30 from producing rattling noise.

To avoid the necessity of tight tolerances with respect to the overall axial lengths of the light bar 30 and lens 21, an insert 62 of sufficiently compliant elastic foam is preferably captured within the hollow inside portion 58 of each end cap 47 and each far end of LED light bar 30 so as to dampen vibration, and restrain light bar 30 from excessive axial movement or rattling.

A pair of couplings 18A and 18B are provided for mounting the lighting device 1 in line with, and between, the free ends 3, 4 of the pair of tubular members 6A, 6B which are preferably at least approximately aligned with one another and are separated from one another by a gap 2. In a typical retrofit application, tubular members 6A, 6B will typically be what was once a unitary member (such as a handrail, or part of the aluminum tubing forming tubular structure such as a tower or such as a fishing tower or a so called "T-top" of the type generally used on small to moderately sized fishing boats, dive boats and pleasure craft) from which a portion has been removed leaving a gap 2 of appropriate length to accommodate installation of lighting device 10.

One end 65 of each coupling 18A, 18B is slipped over the free end 3, 4 of its respective tubular member 6A, 6B while a corresponding end of tubular housing 12 is retained inside the other end 66 of each coupling 18A, 18B. The couplings 18A, 18B are then secured to each respective member using any suitable conventional type of fasteners 68 such as set screws or rivets. If desired, couplings 18A, 18B can alternatively, or additionally, be welded to members 6A, 6B and/or to tubular housing 12. It is preferable however to secure at least one of couplings 18A, 18B in a manner that permits it to freely slide bi-directionally in a longitudinal sense, as indicated by bi-directional arrow 77 when fasteners 68 are loosened so that lighting device 10 can readily be installed, removed and re-installed whenever desired.

Figure 2:
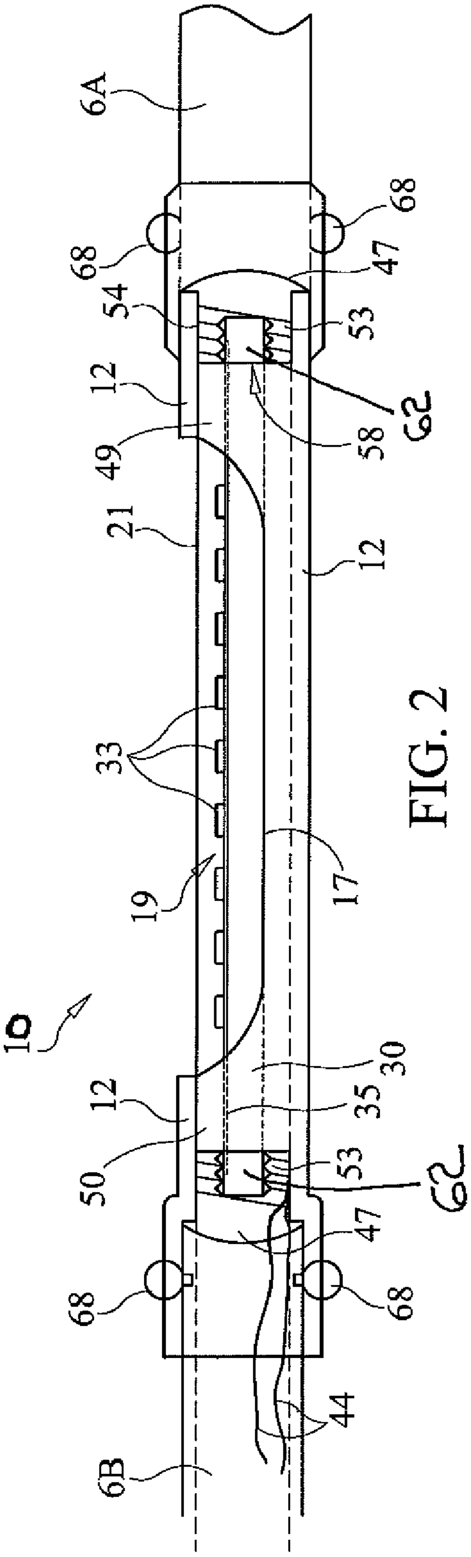
FIG. 2 is a side view partially showing an alternative embodiment of a lighting device.

In the alternate embodiment of FIG. 2, one end of housing 12 has been provided with a flared end 99 formed as an integral part of housing 12. The flared end 99 has an inside diameter which allows a slip-fit onto tubular member 6B thus eliminating the need for a separate coupling such as the coupling 18B of FIG. 1.

Figure 3:
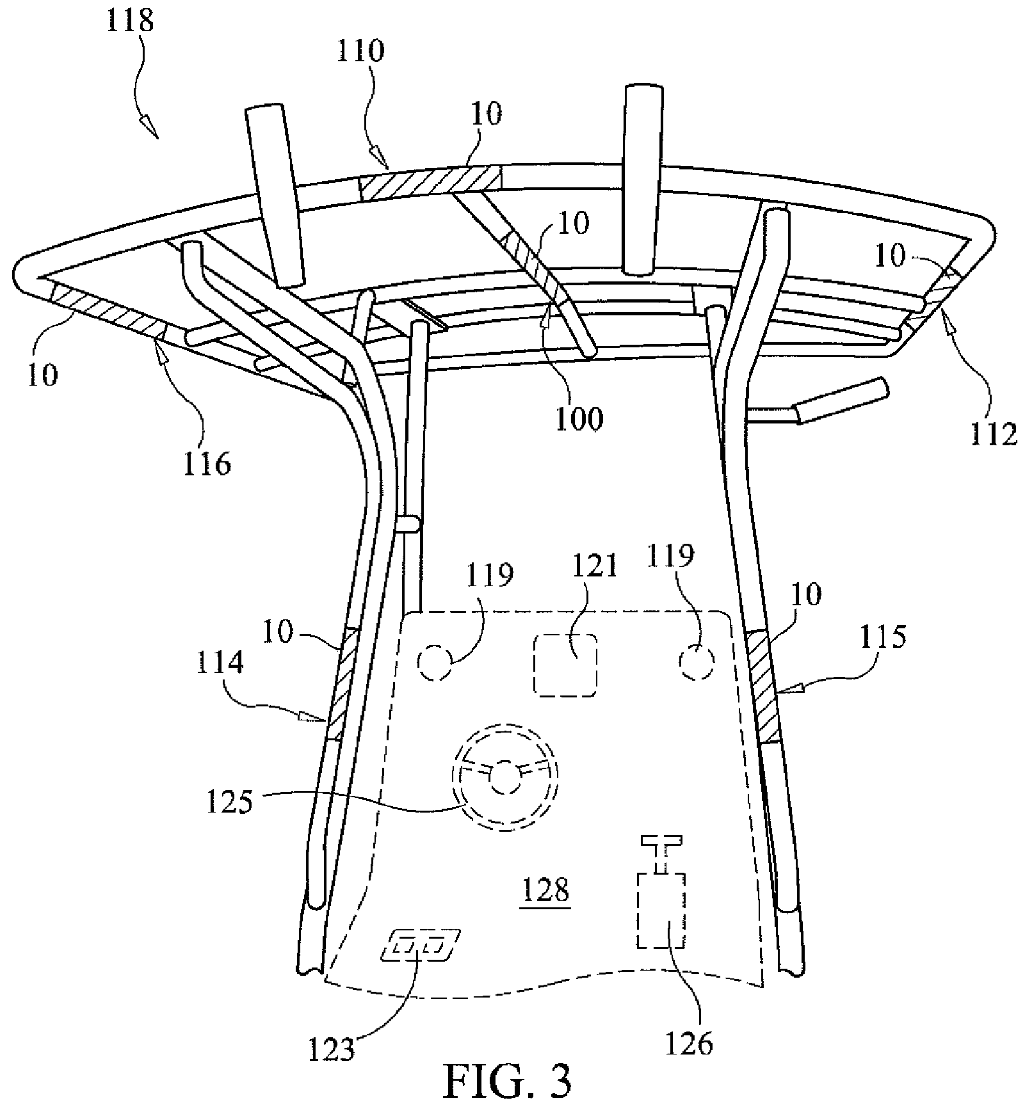
FIG. 3 is an illustration of a preferred embodiment of a marine T-top indicating examples of locations in the T-top in which one or more lighting devices according to FIG. 1 or 2 may be provided.
Figure 4:
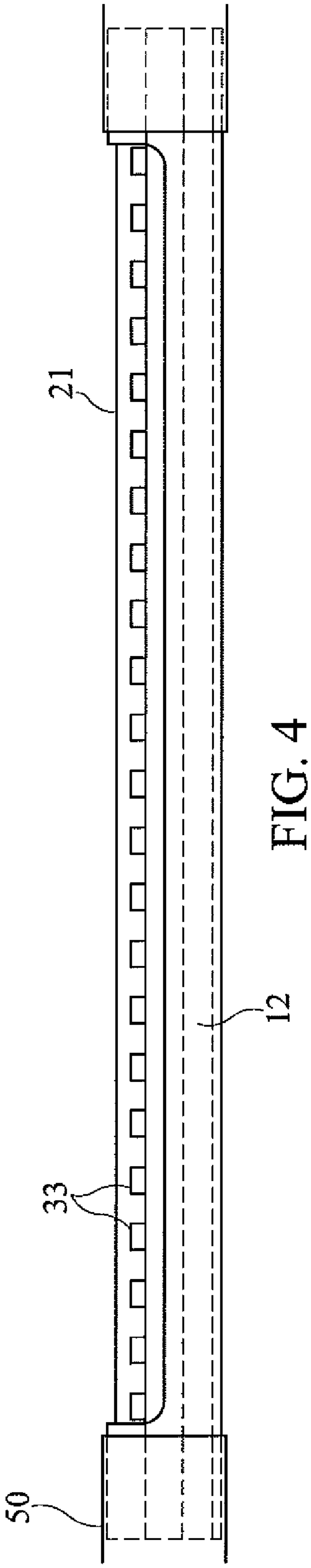
FIG. 4 is a partial side sectional view of a preferred embodiment of a lighted marine handrail according to the invention.

FIG. 3 illustrates a preferred embodiment of a lighted marine structure, in this instance, a lighted marine T-top 118 according the present invention, illustrating a number of preferred mounting locations 100, 110, 112, 114, 115 and 116 at which a marine T-top 118 may include one or more marine lighting devices 10 such as, for example, one(s) according to the embodiments of FIG. 1 or FIG. 2. As FIG. 3 shows, a marine lighting device 1 may be mounted in one or more overhead mounting locations 100, 110, 112, 116 to provide general illumination and/or can be mounted at lower locations such as the locations 114, 115 in upright support member of T-top at lower elevations where thy can provide task lighting for viewing gauges 119 or viewing or operating navigational or other instruments 121, switches 123 steering controls 125, throttle controls 126 or the like associated with the helm station 128 or other portion of a marine vessel (not shown), to which T-top 128 is attached.

Figure 5:
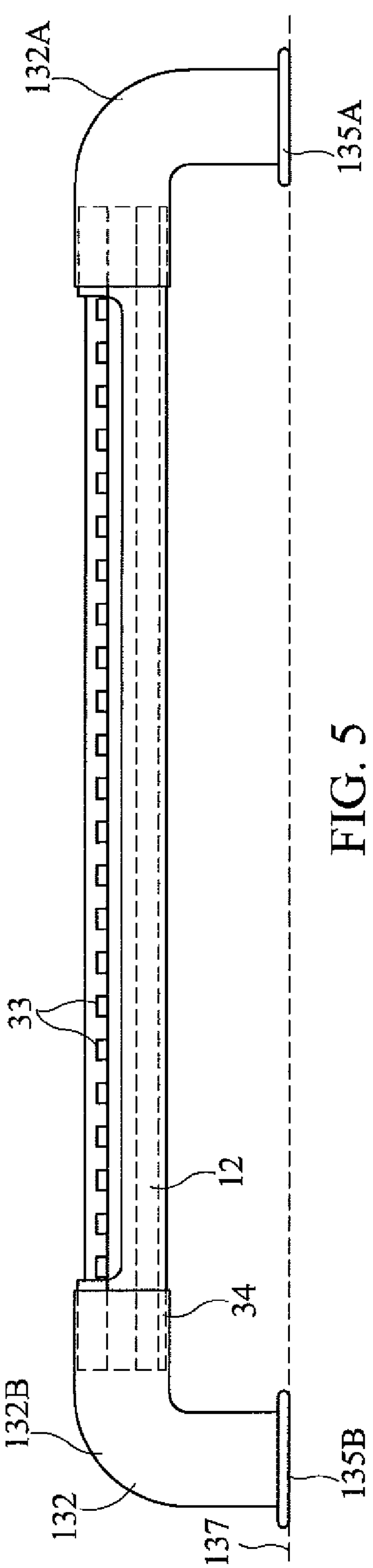
FIG. 5 is a full side view, partially in section, of the embodiment of FIG. 4.
Figure 6:
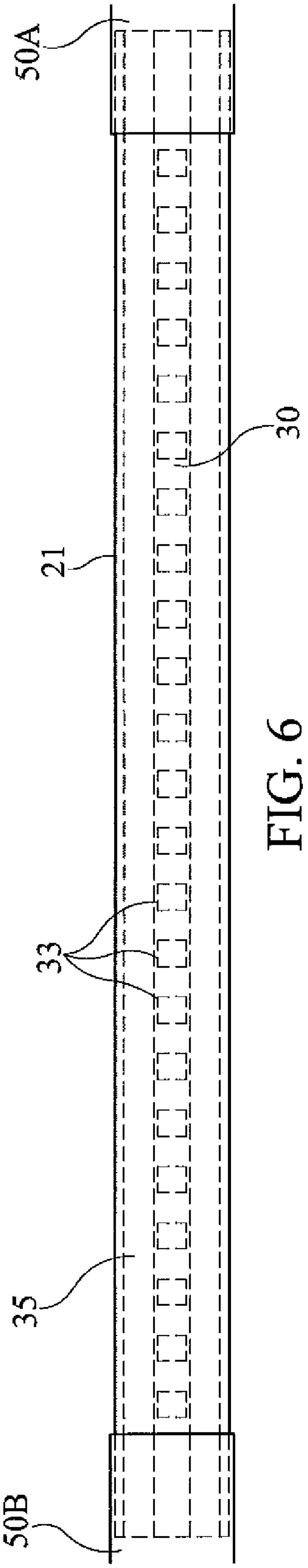
FIG. 6 is a partial top view corresponding to FIG. 4.
Figure 7:
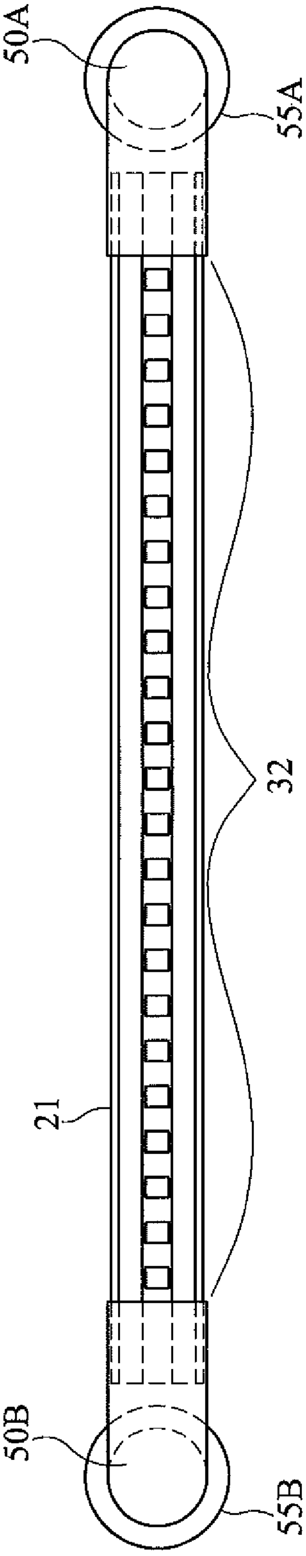
FIG. 7 is a top view corresponding to FIG. 5.

FIGS. 5 through 7 illustrate a preferred embodiment of a lighted marine handrail 130 according to the invention. This lighted marine handrail 130 is otherwise constructed and operates as described with respect to the marine lighting device 10 of FIG. 1 except, however, that right angle rail supports 132A, 132B are provided in place of couplings 18A, 18B. Supports 132A, 132B incorporate a respective mounting flange 135A, 135B which may be fastened to a surface 137 such as the wall of a stairwell, passageway or cabin or an exterior surface of a vessel such as a surface on the deck, gunwales or hull of the vessel using screws, adhesive or any other suitable fasteners.

In FIGS. 4 through 7, the LEDs 33 are shown as being oriented to cast light in a direction generally away from the flanges 135A, 135B. Such configuration is well suited to casting light directly on the stairs of a stairwell. Alternatively, the rail supports 132A, 132B can be rotated one hundred eighty degrees (180°) from the position shown in FIGS. 5 and 7. In that orientation, the LEDs 33 would cast light toward the mounting wall surface thus providing a pleasing indirect lighting of adjacent areas.

Although referred to above as a marine handrail, the device 130 of FIGS. 4 through 7 could readily be dimensionally adapted for use as a towel rack or a curtain rod.

Figure 8:
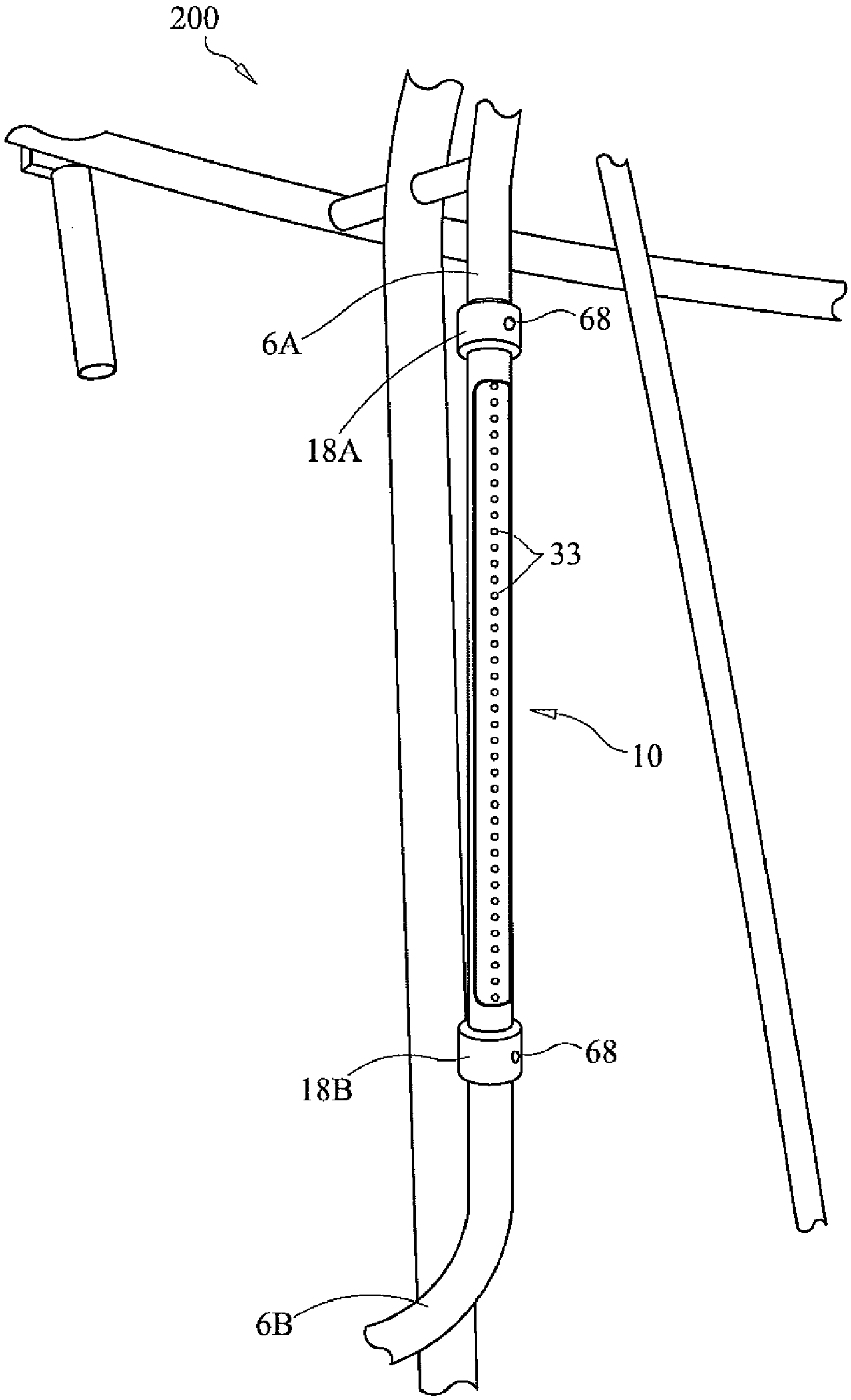
FIG. 8 is an illustration of a portion of a tubular marine structure, which includes a marine lighting device of the embodiment of FIG. 1.

FIG. 8 shows a portion of a tubular structure 200 for a marine vessel, such as a T-top 128, tower, or the like, which includes at least one marine lighting device 10 according to the invention. Except for incorporation of one or more marine illumination devices 10 according to the invention, the T-top 128, tower, or other marine vessel tubular structure, 200 may be of any conventional overall configuration formed of one or more tubular members.

A further aspect of the invention relates to a method of mounting a marine illumination device 10 in-line with a tubular member:

(a) one removes from the tubular member 6A, 6B a longitudinal segment (not shown) of suitable length. This leaves a pair of free tubular ends 3, 4 separated by a gap 2 therebetween;

(b) a marine lighting device 10 having an elongated exterior housing 12 whose length at least approximately corresponds to that of the gap 2 is provided;

(c) a first coupling 18A is fitted onto either a first one 3 of the free ends 3, 4 of the tubular member 6A or a first end 25 of the housing 12;

(d) the first one 3 of the free ends 3, 4 and the first end 25 of the housing 12 are brought into at least approximate mutual axial alignment with one another;

(e) the first coupling 18A is moved into position such that at least a portion of the first end 25 of the housing 12 and at least a portion of the tubular member adjacent its first free end 3 are received into the coupling 18A in at least approximate axial alignment; and (f) steps (c) through (e) are repeated except using a second coupling for connecting the second one 4 of the free ends of the tubular member 6B with the second end of the housing 12.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A marine lighting device mountable in a gap between free ends of a tubular member of a marine structure of a marine vessel, said device comprising:

an LED light bar having a circuit board and an LED array supportably mounted to said circuit board, said LED array including a plurality of light emitting diodes;

a suitably light transmissive lens having a tubular body with a hollow interior within which said LED light bar is enclosed; and a housing having a unitary wall which forms a tubular first end, a tubular second end, and a central portion located between said tubular first end and said tubular second end, said tubular first end and said tubular second end being mutually spaced from one another along a longitudinal axis of said housing, said central portion joining said tubular first end and said tubular second end fixedly to one another, said unitary wall being penetrated by an opening located between said tubular first end and said tubular second end, said tens being mounted inside said housing such that a portion of said light transmissive lens overlying said LED array is interposed between said LED array and said opening, said light emitting diodes being oriented to cast light through said portion of said lens and through said opening when said light emitting diodes are electrically energized, and at least one coupling which mounts said housing in the gap axially in line with the free ends of the tubular member of the marine structure, said at least one coupling including at least a first coupling which internally receives both a first one of the free ends of the tubular member of the marine structure and at least a portion of said tubular first end of said housing.

2. A marine lighting device according to claim 1 wherein said first coupling comprises a hollow sleeve.

3. A marine lighting device according to claim 1 wherein said at least one coupling further comprises a second coupling within which internally receives both a second one of the free ends of the tubular member of the marine structure and at least a portion of said tubular second end of said housing.

4. A marine lighting device according to claim 3 wherein said second coupling comprises a hollow sleeve.

5. A marine lighting device according to claim 1 wherein said tubular body is sealed to prevent intrusion of water into said interior.

6. A marine lighting device according to claim 5 wherein said tubular body has a pair of opposed ends each of said opposed ends being sealed against said intrusion of water by a respective one of a pair of end caps.

7. A marine lighting device according to claim 6 wherein said end caps each have a respective hollow inside portion within which an end of said light bar is received.

8. A marine lighting device according to claim 7 wherein an insert of a compliant material is captured within said hollow inside portion.

9. A lighted structure for a marine vessel, said structure being of a type formed of at least one tubular member, said lighted structure, comprising:

an LED light bar having a circuit board and an LED array supportably mounted to said circuit board, said LED array including a plurality of light emitting diodes;

a suitably light transmissive lens having a tubular body with a hollow interior within which said LED light bar is enclosed; and a housing having a unitary wall which forms a tubular first end, a tubular second end, and a central portion located between said tubular first end and said tubular second end, said tubular first end and said tubular second end being mutually spaced from one another along a longitudinal axis of said housing, said central portion joining said tubular first end and said tubular second end fixedly to one another, said unitary wall being penetrated by an opening located between said tubular first end and said tubular second end, said lens being mounted inside said tubular housing such that a portion of said light transmissive lens overlying said LED array is interposed between said LED array and said opening, said light emitting diodes being oriented to cast light through said portion of said lens and through said opening when said light emitting diodes are electrically energized, and at least one coupling which mounts said housing in the gap axially in line with the free ends of the tubular member of the marine structure, said at least one coupling including at least a first coupling which internally receives both a first one of the free ends of the tubular member of the marine structure and at least a portion of said tubular first end of said housing.

10. A lighted structure for a marine vessel according to claim 9 wherein said first coupling comprises a hollow sleeve.

11. A lighted structure for a marine vessel according to claim 9 wherein said at least one coupling further comprises a second coupling within which internally receives both a second one of the free ends of the tubular member of the marine structure and at least a portion of said tubular second end of said housing.

12. A lighted structure for a marine vessel according to claim 11 wherein said second coupling comprises a hollow sleeve.

13. A lighted structure for a marine vessel according to claim 9 wherein said tubular body is sealed to prevent intrusion of water into said interior.

14. A lighted structure for a marine vessel according to claim 9 wherein said tubular body has a pair of opposed ends each of said opposed ends being sealed against said intrusion of water by a respective one of a pair of end caps.

15. A lighted structure for a marine vessel according to claim 9 wherein said end caps each have a respective hollow inside portion within which an end of said light bar is received.

16. A lighted structure for a marine vessel according to claim 9 wherein an insert of a compliant material is captured within said hollow inside portion.

17. A lighted T-top for a marine vessel, said T-top comprising:

a plurality of tubular members joined to form a T-top structure;

a plurality of tubular members coupled to said structure for supporting said roof structure over a portion of a marine vessel;

an LED light bar having a circuit board and an LED array supportably mounted to said circuit board, said LED array including a plurality of light emitting diodes;

a suitably light transmissive lens having a tubular body with a hollow interior within which said LED light bar is enclosed; and a housing having a unitary wall which forms a tubular first end, a tubular second end, and a central portion located between said tubular first end and said tubular second end, said tubular first end and said tubular second end being mutually spaced from one another along a longitudinal axis of said housing, said central portion joining said tubular first end and said tubular second end fixedly to one another, said unitary wall being penetrated by an opening located between said tubular first end and said tubular second end, said lens being mounted inside said housing such that a portion of said light transmissive lens overlying said LED array is interposed between said LED array and said opening, said light emitting diodes being oriented to cast light through said portion of said lens and through said opening when said light emitting diodes are electrically energized, and at least one coupling for mounting, said housing axially in line with the free ends of the member of the marine structure, said at least one coupling including at least at least one coupling which mounts said housing in the gap axially in line with the free ends of the tubular member of the marine structure and at least .~.portion of said tubular first end of said housing.

18. A lighted T-top for a marine vessel according to claim 17 wherein said first coupling comprises a hollow sleeve.

19. A lighted T-top for a marine vessel according to claim 17 wherein said at least one coupling further comprises a second coupling within which internally receives both a second one of the free ends of said tubular member of the marine structure and said second end of said tubular housing.

20. A lighted T-top for a marine vessel according to claim 19 wherein said second coupling comprises a hollow sleeve.

21. A lighted T-top for a marine vessel according to claim 17 wherein said interior of said tubular body is sealed to prevent intrusion of water into said interior.

22. A lighted T-top for a marine vessel according to claim 17 wherein said tubular body has a pair of opposed ends each of said opposed ends being sealed against said intrusion of water by a respective one of a pair of end caps.

23. A lighted T-top for a marine vessel according to claim 17 wherein said end caps each have a respective hollow inside portion within which an end of said light bar is captured.

24. A lighted T-top for a marine vessel according to claim 17 wherein an insert of a compliant material is captured within said hollow inside portion.

25. A method of mounting a marine illumination device in-line with a tubular member of a marine structure of a marine vessel, said method comprising the steps of:

(a) providing a first free end and a second free end of the tubular member of the marine structure, said first free end and said second free end being separated from one another by a longitudinal gap of fixed length;

(b) providing a marine lighting device having a housing, said housing having a first end and a second end which are separated from one another along a longitudinal axis the tubular member of the marine structure;

(c) receiving said first free end of the tubular member of the marine structure and at least a portion of said first end of said housing into a first coupling to mechanically couple the first free end of the tubular member and said first end of said housing to one another in at least approximate mutual axial alignment with said longitudinal axis; and (d) receiving both said second free end of the tubular member of the marine structure and at least a portion of said second end of said housing into a second coupling to mechanically couple the said second free end of the tubular member and said second end of said housing to one another in at least approximate mutual axial alignment with said longitudinal axis.

26. The method of claim 25 wherein step (a) thereof comprises the step of removing from the tubular member a section by way of which the first free end and the second free end were previously joined.

* * * * *